(12) United States Patent
Inoue et al.

(10) Patent No.: US 6,926,956 B2
(45) Date of Patent: Aug. 9, 2005

(54) TRANSPARENT CONDUCTIVE HEAT SEALING MATERIAL AND CARRIER TAPE LID USING SAME

(75) Inventors: Isao Inoue, Tokyo-to (JP); Hiroko Takamori, Tokyo-to (JP); Masumi Hyakutome, Tokyo-to (JP); Kazuhito Fujii, Tokyo-to (JP); Hideki Imamura, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/631,561

(22) Filed: Jul. 31, 2003

(65) Prior Publication Data

US 2004/0023022 A1 Feb. 5, 2004

Related U.S. Application Data

(62) Division of application No. 09/980,803, filed as application No. PCT/JP01/02858 on Apr. 2, 2001, now Pat. No. 6,635,343.

(30) Foreign Application Priority Data

Apr. 3, 2000 (JP) .................................. P2000-100524
Mar. 23, 2001 (JP) .................................. P2001-83965

(51) Int. Cl.$^7$ ............................ B32B 5/16; B32B 15/04; B32B 7/12
(52) U.S. Cl. .................... 428/323; 428/343; 428/346; 428/347; 428/349; 428/353; 428/354; 428/355 R; 428/356; 428/325
(58) Field of Search .......................... 428/355 R, 325, 428/323, 343, 346, 347, 349, 353, 354, 355, 356, 500, 521

(56) References Cited

U.S. PATENT DOCUMENTS 5,837,209 A * 11/1998 Saegusa ...................... 423/89
5,846,652 A * 12/1998 Yamashita .................. 428/349

* cited by examiner

Primary Examiner—Holly Rickman
(74) Attorney, Agent, or Firm—Ladas & Parry LLP

(57) ABSTRACT

The present invention has a main object to provide a transparent conductive heat sealing material of which antistatic property does not deteriorates even at a low humidity, and has a transparency to an extent of permitting visual recognition of the contents and a carrier tape lid using the same. To achieve this object, the transparent conductive heat sealing material of the invention is characterized by a heat-sealable synthetic resin, and conductive fine particle having a 50% particle size of up to 1.0 $\mu$m.

10 Claims, 3 Drawing Sheets

TRANSPARENT CONDUCTIVE HEAT SEALING MATERIAL AND CARRIER TAPE LID USING SAME

REFERENCE TO RELATED APPLICATIONS

This is a divisional of U.S. patent application Ser. No. 09/980,803 filed Dec. 3, 2001, now U.S. Pat. No. 6,635,343, filed under Rule 371, and based on International Application No. PCT/JP01/02858, filed Apr. 2, 2001.

TECHNICAL FIELD

The present invention relates to a transparent conductive heat sealing material suitably applicable for a lid of a carrier tape package used upon storing, transporting or mounting electronic products easily susceptible to breakage by static electricity, particularly such as a chip-type electronic product or an electronic circuit board already mounting parts, and a carrier tape lid using the same.

BACKGROUND ART

Surface-mounted chip-type electronic parts such as ICs as well as transistor, diodes, capacitors and piezo-electric element registers are supplied in the form packaged in a carrier tape package comprising a plastic carrier tape (hereinafter simply referred to as a "carrier tape") having continuously emboss-formed pockets capable of housing the parts in response to shapes of the parts and a carrier tape lid (hereinafter sometimes simply referred to as a "lid") heat-sealed to the carrier tape. The electronic parts therein contained are automatically taken out from the carrier tape after peeling off the lid of the carrier tape package, and surface-mounted on an electronic circuit board.

Along with the recent remarkable improvements achieved in the surface-mounting technology, these electronic parts transported or otherwise handled in the above-mentioned carrier tape package have improved performance and are downsized. These electronic parts may be broken under the effect of electrostatic discharge as a result of contact between the carrier tape emboss inner surface or the lid inner surface and the electronic parts caused by vibration during transportation of the carrier tape package. A similar trouble may occur from static electricity produced upon peeling off the lid from the carrier tape. Measures against electrostatic troubles have therefore been the most important problem to be solved in the carrier tape and the lid.

A charge preventing treatment (an antistatic treatment) of a carrier tape has conventionally been accomplished through kneading of carbon black into a material used, or coating, giving satisfactory effects. For the lid, however, transparency to an extent permitting visual recognition of the contents is required. Since an antistatic treatment similar to that for the carrier tape cannot be conducted, therefore, the following antistatic treatments have been proposed:

(1) Kneading a surfactant-based antistatic agent into plastics, or conducting coating onto a plastic surface;

(2) Laminating aluminum foil films;

(3) Coating a plastic resin prepared by kneading a metal oxide-based conductivity agent such as tin oxide.

The method (1) above has, however, a problem in that the antistatic function deteriorates or even disappears under a low-humidity condition. The methods (2) and (3) above have a problem in that transparency of the lid cannot be maintained, and visual recognition of the contents is difficult or even impossible.

DISCLOSURE OF INVENTION

The present invention was developed to solve the aforementioned problems, and has a main object to provide a transparent conductive heat sealing material of which the antistatic function is not deteriorated even at low humidity, and which has a transparency to an extent permitting visual recognition of contents, and a carrier tape lid using the same.

The invention provided a transparent conductive heat sealing material comprising conductive fine particles 50% of which have a particle size of up to 1.0 μm at least dispersed in a heat sealable synthetic resin.

The transparent conductive heat sealing material of the invention is a heat sealing material which is a conductive and excellent in transparency because conductive fine particles 50% of which have a particle size of up to 1.0 μm dispersed in a heat-sealable synthetic resin.

In the invention, the transparent conductive heat sealing material should preferably have a surface resistance of $10^4$ to $10^{12}$ Ω/square. The transparent conductive heat sealing material should preferably have optical properties resulting in a full-light transmissivity of at least 70% in a laminated member obtained by laminating the transparent conductive heat sealing material with other lamination material, and in a haze of up to 25%. When the transparent conductive heat sealing material of the invention is used as a heat sealing material in a carrier tape lid which is the most suitable use for a laminated member obtained by laminating the transparent conductive heat sealing material layers of the invention, the required antistatic property and optical properties are within the above-mentioned ranges.

In the invention, the aforementioned conductive fine particles should preferably be acicular fine particles. If the fine particles are acicular in shape, the individual fine particles dispersed in a heat-sealable synthetic resin would highly probably be kept in contact between them, so that a small quantity of such fine particles can bring about an effect of reducing electric resistance. The material, being satisfactory in transparency, is favorable for improving antistatic effect while maintaining satisfactory transparency.

The above-mentioned conductive fine particles should preferably comprise fine particles prepared by imparting conductivity to a metal oxide. Among others, the fine particles prepared by imparting conductivity to the metal oxide should preferably comprise acicular powder of antimony-doped tin oxide. When availability of particles and performance are taken into account, the acicular powder of conductive fine particles should preferably comprise fine particles prepared by imparting conductivity to a metal oxide, and among others, acicular powder of antimony-doped tin oxide.

In an aspect of the invention, the above-mentioned conductive fine particles may comprise spherical fine particles. Spherical fine particles also have an effect of reducing electric resistance. Because of a satisfactory transparency, such fine particles are preferable for improving antistatic effect while maintaining satisfactory transparency.

In this case, the conductive fine particles should preferably comprise fine particles prepared by imparting conductivity to a metal oxide, and among others, the fine particles prepared by imparting conductivity to the metal oxide should preferably comprise spherical powder of antimony-doped tin oxide.

In an aspect of the invention, the heat-sealable synthetic resin should preferably comprise any one of a polyester resin, a polyurethane resin, a vinyl chloride-vinyl acetate copolymer resin, an acryl resin, and an ethylene-vinyl acetate copolymer resin, or a combination thereof.

The invention provides, furthermore, a carrier tape lid formed by a transparent conductive heat sealing material comprising conductive fine particles 50% of which have a particle size of up to 1.0 μm at least dispersed in a heat sealable synthetic resin, and comprising at least a heat sealing layer heat-sealed by a carrier tape, an outer layer formed by a biaxially oriented film, and a cushion layer arranged between the heat sealing layer and the outer layer.

The carrier tape lid of the invention has a heat sealing layer formed with the above-mentioned transparent conductive heat sealing material. When heat-sealing it to a carrier tape, it brings about an effect of permitting visual recognition of the contents while keeping a satisfactory antistatic function.

In this case, the cushion layer should preferably comprise a layer mainly comprising a polymer material having a low degree of crystallinity. By using a polymer material having a low crystallinity as a main constituent, it is possible to inhibit contraction of the cushion layer during the manufacturing process of the carrier tape lid. It is thus possible to prevent curling of the carrier tape lid caused by contraction of the cushion layer, giving a better operability.

In the carrier tape lid of the invention, the cushion layer may comprise a layer formed by polyolefin having a density within a range of from 0.900 to 0.910 g/cm$^3$ and a weight average molecular weight within a range of from 20,000 to 100,000. Selection of this material as a cushion layer improves cushioning function, thus permitting reduction of the thickness of the cushion layer. By thus reducing the thickness of the cushion layer, it is possible to inhibit contraction of the cushion layer during manufacture, prevent curling of the resultant carrier tape lid, and improve operability.

Furthermore, the cushion layer may comprise at least three kinds of resin including at least an ethylene-α-olefin copolymer and a styrene-butadiene block copolymer, selected from the group consisting of ethylene-α-olefin copolymer having a density within a range of from 0.915 to 0.940 g/cm$^3$, a styrene-butadiene copolymer comprising from 50 to 90 wt. % styrene and from 50 to 10 wt. % butadiene, a hydrogenated styrene-butadiene block copolymer comprising from 10 to 50 wt. % styrene and from 90 to 50 wt. % butadiene, and a high-impact polystyrene.

The above-mentioned cushion layer may also have a double-layer structure comprising a first resin layer and a second resin layer in contact with the heat sealing layer; the first resin layer comprises an ethylene-α-olefin copolymer having a density within a range of from 0.915 to 0.940 g/cm$^3$; and the second resin layer comprises a resin composition prepared by adding from 5 to 30 weight parts hydrogenated styrene-butadiene block copolymer comprising from 10 to 50 wt. % styrene and from 90 to 50 wt. % butadiene to 100 weight parts resin composition comprising from 10 to 90 wt. % ethylene-α-olefin copolymer having a density within a range of from 0.915 to 0.940 g/cm$^3$ and from 70 to 30 wt. % styrene-butadiene block copolymer comprising from 50 to 90 wt. % styrene and from 50 to 10 wt. % butadiene.

The above-mentioned cushion layer may have a triple-layer structure comprising a first resin layer, a second resin layer and a third resin layer in contact with the heat sealing layer; the first resin layer comprises an ethylene-α-olefin copolymer having a density within a range of from 0.915 to 0.940 g/cm$^3$; the second resin layer comprises a resin composition containing from 10 to 90 wt. % ethylene-α-olefin copolymer having a density within a range of from 0.915 to 0.940 g/cm$^3$, and from 70 to 30 wt. % styrene-butadiene block copolymer containing from 50 to 90 wt. % styrene and from 50 to 10 wt. % butadiene; and the third resin layer comprises a resin composition prepared by adding from 5 to 30 weight parts hydrogenated styrene-butadiene block copolymer containing from 10 to 50 wt. % styrene and from 90 to 50 wt. % butadiene to 100 weight parts resin composition comprising from 10 to 90 wt. % ethylene-α-olefin copolymer having a density within a range of from 0.915 to 0.940 g/cm$^3$ and from 70 to 30 wt. % styrene-butadiene block copolymer containing from 50 to 90 wt. % styrene and from 50 to 10 wt. % butadiene.

The invention also provides a carrier tape lid formed by a transparent conductive heat sealing material comprising conductive fine particles of which 50% have a particle size of up to 1.0 μm, and comprising at least a heat sealing layer heat-sealed by a carrier tape, an outer layer formed by a biaxially oriented film, a cushion layer arranged between the heat sealing layer and the outer layer, and a primer layer arranged between the heat sealing layer and the cushion layer.

Because, in the carrier tape lid of the invention, a primer layer is further arranged between the heat sealing layer and the cushion layer of the carrier tape lid, it is suitably applicable particularly to a case where it is required to inhibit delamination between the cushion layer and the heat sealing layer, or to a case where it is required to improve adhesivity between the cushion layer and the heat sealing layer. Delamination between the cushion layer and the heat sealing layer is therefore inhibited, thus enabling to improve exterior view upon peeling off the lid heat-sealed to the carrier tape. Since it is possible to improve adhesivity between the cushion layer and the heat sealing layer, it is possible to adjust adhesivity of the lid to above an appropriate level of strength.

The above-mentioned primer layer should preferably be formed by a resin composition comprising from 0 to 100 wt. % styrene-ethylene-butylene-styrene copolymer and from 100 to 0 wt. % acid-modified styrene-ethylene-butylene-styrene copolymer. According to this aspect of the invention, it is possible to remarkably improve adhesivity between the primer layer and the cushion layer, and simultaneously, to improve adhesivity also between the primer layer and the heat sealing layer. As a result, by the presence of the primer layer in between, in the heat sealing lamination of the invention, it is possible to bond the cushion layer and the heat sealing layer with a sufficient strength.

Acrylic rubber should preferably be added at a ratio of up to 60 wt. % relative to the total resin composition to the resin composition forming the primer layer. According to this aspect of the invention, it is possible to ensure more remarkable effect of the primer layer and further improve adhesivity by adding an acrylic rubber in an amount of up to 60 wt. % relative to the entire resin composition.

The invention provides furthermore a carrier tape package comprising the carrier tape lid heat-sealed to a carrier tape having continuous housing sections which house package members. The carrier tape package of the invention, having the carrier tape lid as described above, provides an effect of permitting visual recognition of the contents without causing breakage by electrostatic discharge to the packaged contents.

BEST MODE FOR CARRYING OUT THE INVENTION

Figure 1:
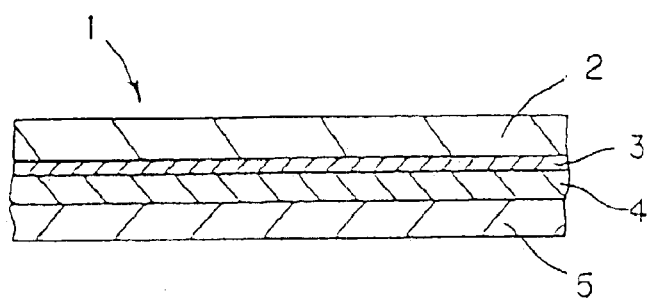
FIG. 1 is a schematic sectional view illustrating an example of the lid of the present invention.

The present invention will be described in detail. After first explaining the transparent conductive heat sealing material, the carrier tape lid using this transparent conductive heat sealing material for a heat sealing layer will be described, and finally a carrier tape package having this carrier tape lid will be described.

1. Transparent Conductive Heat Sealing Material

The transparent conductive heat sealing material of the invention has at least a heat-sealable synthetic resin and conductive fine particles having a 50% particle size of up to 1.0 µm, in which the conductive fine particles are dispersed in the synthetic resin.

The heat-sealable synthetic resin used in the invention is a resin applicable as a heat sealing material in general, and there is no particular restriction imposed thereon only so far as a resin is transparent in the visible light region. More specifically, there is used any one of a polyester resin, a polyurethane resin, a vinyl chloride-vinyl acetate copolymer resin, an acryl resin and an ethylene-vinyl acetate copolymer resin or a combination thereof. These resins are most suitably applicable, in terms of adhesivity and strength in a carrier tape lid which is a main use of the transparent conductive heat sealing material.

The conductive fine particles used in the invention should preferably have a 50% particle size of up to 1.0 µm. The term "50% particle size" as used herein means a particles size of 50% of particles. Conductive fine particles having such a particle size may be spherical (same as granular) fine particles, or acicular fine particles. Acicular fine particles are particularly preferable because satisfactory conductivity and transparency are available even with addition of the same weight.

When conductive fine particle are acicular in shape, the particles should preferably have a 50% particle size of up to 0.40 µm, particularly up to 0.36 µm, and more preferably, up to 0.32 µm. These particles sizes, being under the short wavelength region of visible light, are desirable with a view to ensuring transparency. The term "acicular" as used herein means having a ratio of the fine particle longitudinal length to the width of the fine particles of at least 5:1.

When the conductive fine particles are spherical in shape, on the other hand, the 50% particle size should preferably be up to 1.0 µm, particularly up to 0.8 µm, and more preferably, up to 0.6 µm. The spherical fine particles having such a particle size permit achievement of transparency, and suitably applicable.

There is no particular restriction imposed on the spherical or acicular conductive fine particles used in the invention, so far as they are conductive fine particles. Applicable fine particles include fine particles such as gold, silver, nickel, aluminum or copper, carbon black fine particles, conductive fine particles prepared by imparting conductivity to a metal oxide such as tin oxide, zinc oxide or titanium oxide, conductive fine particles prepared by imparting conductivity to barium sulfate, and conductive fine particle prepared by imparting conductivity to a sulfide such as zinc sulfide, copper sulfide, cadmium sulfide, nickel sulfide or palladium sulfide.

In the invention, among others, particles prepared by imparting conductivity to a metal oxide such as tin oxide, zinc oxide or titanium oxide are suitably applicable, and particularly, fine particles of antimony-doped tin oxide is preferable. Antimony-doped tin oxide should have a volume resistivity of up to 500 Ωm, or more preferably, up to 100 Ωm, for ensuring a satisfactory conductivity.

The transparent conductive heat sealing material of the invention is manufactured by mixing and dispersing the above-mentioned conductive fine particles in the aforementioned heat-sealable synthetic resin. The fine particles are uniformly dispersed by use of any of various kinds of organic dispersing agent. In the invention, it is particularly desirable to manufacture the transparent conductive heat sealing material by adopting spherical or acicular antimony-doped tin oxide as the conductive fine particles and adopting an acryl resin as the heat-sealable synthetic resin.

The mixing ratio of the conductive fine particles to the synthetic resin in the invention, depending upon the kind and particle size of the conductive fine particles, should usually be within a range of from 10 to 1,000 weight parts, or preferably, from 100 to 800 weight parts relative to 100 weight parts synthetic resin. If the quantity of the conductive fine particles is smaller than the above-mentioned range, conductivity would be insufficient, leading to the risk of causing problems in the antistatic performance. A quantity of the conductive fine particles larger than the above-mentioned range is not desirable because of problems in heat sealing property and various other problems including difficulty in dispersing in the synthetic resin.

The surface resistivity of the transparent conductive heat sealing material of the invention should preferably be within a range of from $10^4$ to $10^{12}$ Ω/square, or more preferably, from $10^5$ to $10^{12}$ Ω/square, or most preferably, from $10^6$ to $10^{11}$ Ω/square. A surface resistivity lower than this range may cause problems in the antistatic performance, and when the surface resistivity is higher than this range, no further higher antistatic performance may be required, and there may be caused problems in cost.

The optical properties of the transparent conductive heat sealing material of the invention should include a full-light transmissivity, in a laminated member obtained by laminating the transparent conductive heat sealing material with other laminating materials, of at least 70%, and a haze of up to 25%, or more preferably, a full-light transmissivity of at least 75% and a haze of up to 23%, or particularly preferably, a full-light transmissivity of at least 80% and a haze of up to 20%.

The coating weight when using the transparent conductive heat sealing material of the invention, varying with the use, should usually be within a range of from 0.1 to 8 g/m². A coating weight smaller than this range causes problems in adhesion. Even a coating weight of over this range does not bring about a remarkable change in the effect, causing cost problems such as waste of materials cost.

The transparent conductive heat sealing material of the invention as described above is applicable to any use for a heat sealing layer required to have transparency and conductivity (antistatic property). The invention is, however, particularly suitable for use in a heat sealing layer of a carrier tape lid which is required to be transparent and conductive and is now an issue in this area of technology. The carrier tape lid using the above-mentioned transparent conductive heat sealing material as a heat sealing layer will now be described.

2. Carrier Tape Lid

The carrier tape lid of the present invention is formed from the aforementioned transparent conductive heat sealing material and comprises at least a heat sealing layer heat-sealed to a carrier tape, an outer layer formed from a biaxially oriented film, and a cushion layer arranged between the above-mentioned heat sealing layer and outer layer. The carrier tape lid of the invention will now be described with reference to the drawings.

FIG. 1 is a schematic sectional view illustrating an example of the carrier tape lid of the invention. In FIG. 1, the lid 1 has an outer layer 2 formed from a biaxially oriented resin, a cushion layer 4 laminated sequentially on the outer layer 2 via a bonding layer 3, and a heat sealing layer 5. In the example shown in FIG. 1, a bonding layer 3 is formed between the cushion layer 4 and the outer layer 2. This bonding layer 3 is formed as required, and is not an essential component in the invention.

The individual layers composing the carrier tape lid of the invention will be described.

(Outer Layer)

The outer layer 2 in FIG. 1 is composed of a biaxially oriented film, and among others, can be formed with a biaxially oriented film of a polyester resin such as polyethyleneterephthalate (PET), a polyolefin resin such as polypropylene, or a polyamide resin such as nylon. Among them, a biaxially oriented film of any of polyester and polypropylene is suitably applicable. By providing the outer layer comprising a biaxially oriented resin as described above, it is possible to impart heat resistance to the lid. The thickness of the outer layer can appropriately be set in response to the purpose of use of the lid. It may be, for example, within a range of from about 3.5 to 80 µm, or preferably, from 6 to 50 µm. When the thickness is smaller than the above-mentioned range, strength as a carrier tape package may become insufficient, and when the thickness of larger than this level, heat sealing may become difficult.

Adhesivity may be improved by previously applying a surface treatment such as a corona treatment, a plasma treatment or a sand blast treatment to the side of the outer layer facing the cushion layer as required. An antistatic treatment may be applied as required.

(Bonding Layer)

The bonding layer 3 formed between the outer layer 2 and the cushion layer 4 in FIG. 1 may be formed by use of a low-density polyethylene, an ethylene-α-olefin copolymer having a density within a range of from 0.915 to 0.940 g/cm$^3$, a polyethylene-vinylacetate copolymer, an ionomer, polypropylene, polybutadiene, urethane, polyester, or a polyolefin which is one of modified products thereof, an isocyanate-based or imine-based adhesive. The thickness should preferably be within a range of from 0.2 to 60 µm. The bonding layer may be coated onto the outer layer or extrusion-formed, and the cushion layer may be dry-laminated or extrusion-laminated onto the bonding layer. This layer is formed as required as described above.

(Cushion Layer)

The cushion layer formed between the outer layer and the heat sealing layer will now be described. As the cushion layer used in the lid of the invention, the one used for the cushion layer (intermediate layer) of a conventional carrier tape lid may be used with no particular restriction imposed thereon. For example, the cushion layer may comprise any of a medium-density or low-density polyethylene, a straight-chain polyethylene, a polyethylene-vinyl acetate copolymer, an ethylene-methacrylate copolymer (EMAA), an ethylene-methylmethacrylate copolymer (EMMA), a polypropylene, an ionomer, styrene-butadiene-styrene copolymer, a styrene-ethylene-butylene-styrene block copolymer, or a mixture thereof, with a thickness within a range of from about 10 to 100 µm. The cushion layer may be formed by the dry lamination process or the extrusion lamination process.

In the invention, however, three embodiments of cushion layer including an embodiment using an amorphous resin (first embodiment), an embodiment using a low-density polyolefin (second embodiment), and an embodiment using a mixture of an olefin-based resin and a styrene-based resin (third embodiment) are the most preferable. These types will be individually described.

A. First Embodiment

First, the first embodiment of cushion layer suitably used in the lid of the invention will be described. For the cushion layer, a crystalline resin such as a polyethylene resin has conventionally been used. However, when such a crystalline resin is used for the cushion layer, for example, if the crystalline resin is laminated on the outer layer through extrusion lamination, a problem is posed in that the substrate curls under the effect of crystallization upon extrusion. Even when such a crystalline resin film serving as a cushion layer and the outer layer film are laminated by dry lamination, the problem of occurrence of contraction of the crystalline resin used for the cushion layer and the resultant curling, caused by the heat during the drying step when laminating the subsequent primer layer or the heat sealing layer by use of a coating solution.

The first embodiment has an object to improve operability of the step for bonding the lid to the carrier tape by avoiding such curling of the cushion layer, and is characterized in that the cushion layer is formed as a layer mainly comprising a polymer material having a low degree of crystallinity.

By using a polymer material having a low degree of crystallinity as a main constituent, it is possible to inhibit contraction of the cushion layer during manufacture of the carrier tape lid. It is thus possible to prevent curling of the carrier tape lid caused by contraction of the cushion layer, thus leading to a better operability.

In the first embodiment, a polymer material having a low degree of crystallinity include, more specifically, an ionomer, an ethylene-methacrylate copolymer (EMAA), an ethylene-methylmethacrylate copolymer (EMMA), an ethylene-methylacrylate copolymer (EMA), an ethylene-vinyl acetate copolymer (EVA) and the like.

In the first embodiment, such a polymer material having a low degree of crystallinity is used as a main constituent of the cushion layer. The term the main constituent as used herein means a case where the cushion layer is formed by use of only a polymer material having a low degree of crystallinity, and depending upon the kind of material used, a case where the polymer material having a low degree of crystallinity account for more than 50 wt. %, or preferably, more than 60 wt. % of the total.

The cushion layer in this embodiment has a thickness within a range of from 10 to 100 µm as in the above-mentioned conventional cushion layer.

By forming the cushion layer with a polymer material having a low degree of crystallinity as a main constituent as described above, it is possible to improve operability thereafter without causing curling of the lid during forming the lid.

B. Second Embodiment

The second embodiment of cushion layer used suitably for the lid of the invention will now be described. As in the first embodiment, the second embodiment as well has an object to prevent occurrence of curling of the lid.

More specifically, the conventional cushion layer has a prescribed thickness for maintaining cushioning property of the lid, and such a cushion layer posed a problem of curling under various conditions as shown in the above-mentioned first embodiment. This second embodiment is to alleviate and prevent curling during manufacture of the lid caused by the cushion layer by reducing the thickness of the cushion layer while maintaining a cushion property equivalent to that of the conventional cushion layer by use of a material having a satisfactory cushion property.

This second embodiment is characterized in that the cushion layer is formed of a material having a good cushion property. Applicable materials having a good cushion property include olefin having a density within the range of from 0.900 to 0.910 g/cm$^3$, or preferably, from 0.901 to 0.909 g/cm$^3$, and a weight average molecular weight within a range of from 20,000 to 100,000, or preferably, from 30,000 to 90,000.

Such materials include more specifically a straight-chain low-density polyethylene and the like.

The second embodiment of cushion layer may be used, as in the above-mentioned first embodiment, when using in combination with a heat sealing layer comprising the aforementioned transparent conductive heat sealing material, and in addition, may be used for making a lid in combination with a heat sealing layer comprising the conventional heat sealing material. Similar effects are available even in such a case. In the first and second embodiments of cushion layer, it is desirable to apply a surface treatment such as a corona treatment, or combine with a heat sealing layer via a primer layer described later for improving adhesivity.

C. Third Embodiment

Finally, a third embodiment of cushion layer used suitably in the lid of the invention will be described. The third embodiment has an object to improve adhesivity between the cushion layer and the heat sealing layer while ensuring cushion property which is the function as the cushion layer, and particularly, improve adhesivity with the heat sealing layer formed with the aforementioned transparent conductive heat sealing material, and is characterized in that an olefin resin and a styrene resin are used in mixture. In this embodiment, there are a case of using the cushion layer as a single layer, a case with a double layers, and a case with a triple layers. These cases will be described individually.

(1) Cushion Layer as a Single Layer

In this case, the cushion layer is formed from at least three kinds of resin including at least ethylene-α-olefin copolymer and styrene-butadiene block copolymer, selected from the group consisting of an ethylene-α-olefin copolymer having a density within a range of from 0.915 to 0.940 g/cm$^3$, a styrene-butadiene copolymer comprising from 50 to 90 wt. % styrene and from 50 to 10 wt. % butadiene, a hydrogenated styrene-butadiene block copolymer comprising from 10 to 50 wt. % styrene and from 90 to 50 wt. % butadiene, and high-impact polystyrene.

Ethylene-α-olefin copolymer used for forming the cushion layer is a copolymer of ethylene with, for example, butene, pentene, hexene, heptene, octene, and 4-methylpentene-1. If the density of such ethylene-α-olefin copolymer is under 0.915 g/cm$^3$ or over 0.940 g/cm$^3$, the film forming property of the cushion layer based on the combination with styrene-butadiene block-copolymer is deteriorated, and therefore, it is not preferable.

A quantity of styrene composing styrene-butadiene block copolymer used for forming the cushion layer of under 50 wt. % results in an increase in tackiness, thus making it difficult to handle. If the quantity is over 90 wt. %, adherence with the heat sealing layer becomes poor at low temperatures.

The mixing ratio of ethylene-α-olefin copolymer and styrene-butadiene block copolymer in the cushion layer has an important effect on the peeling strength upon peeling off the lid heat-sealed to the carrier tape, and transparency of the lid. In the invention, the mixing ratio of ethylene-α-olefin copolymer and styrene-butadiene block copolymer in the cushion layer 4 is from 10 to 90 wt. % for ethylene-α-olefin copolymer, and from 70 to 30 wt. % for styrene-butadiene block copolymer. If the ratio of ethylene-α-olefin copolymer is under 30 wt. % and the ratio of styrene-butadiene block copolymer is over 70 wt. %, the film forming property of the cushion layer is deteriorated and the transparency of the lid becomes poorer. On the other hand, when the ratio of ethylene-α-olefin is over 70 wt. %, and the ratio of styrene-butadiene block copolymer is under 30 wt. %, tackiness between the cushion layer and the heat sealing layer becomes excessively smaller, and the peeling strength of the lid becomes under the appropriate level.

When the cushion layer is formed from four kinds of resin by use of a hydrogenated styrene-butadiene block copolymer and high-impact polystyrene, it is desirable to add from 5 to 30 weight parts hydrogenated styrene-butadiene block copolymer comprising from 10 to 50 wt. % styrene and from 90 to 50 wt. % butadiene, and from 5 to 50 weight parts high-impact polystyrene relative to 100 weight parts resin composition comprising from 10 to 90 wt. % ethylene-α-olefin copolymer and from 70 to 30 wt. % styrene-butadiene block copolymer.

When the content of hydrogenated styrene-butadiene block copolymer is under 5 weight parts, the effect of addition of hydrogenated styrene-butadiene block copolymer is not realized. If it is over 30 weight parts, blocking resistance of the resultant film is insufficient. If the hydrogenated styrene-butadiene block copolymer is not actually hydrogenated, the copolymer has a high content of butadiene which is easily oxidized and tends to generate gel during formation of the cushion layer 4.

Use of an anhydrous additive may lead to a low film forming accuracy and may make it difficult to form a film.

If the amount of added high-impact polystyrene is under 5 weight parts, the effect of addition of high-impact polystyrene is not available, and if it is over 50 weight parts, transparency of the cushion layer becomes poorer.

The cushion layer may be formed from a resin composition containing three kinds of resin by adding from 5 to 30 weight parts hydrogenated styrene-butadiene block copolymer alone to 100 weight parts resin composition comprising from 10 to 90 wt. % ethylene-α-olefin copolymer and from 70 to 30 wt. % styrene-butadiene block copolymer. The cushion layer may be formed from a resin composition containing three kinds of resin by adding from 5 to 50 weight parts high-impact polystyrene alone to 100 weight parts resin composition comprising from 10 to 90 wt. % ethylene-α-olefin copolymer and from 70 to 30 wt. % styrene-butadiene block copolymer.

The cushion layer of a single-layer structure as described above should preferably have a thickness usually within a range of from 10 to 60 μm. A cushion layer thickness of under 10 μm results in a poorer film forming property, and a thickness of over 60 μm leads to deterioration of heat sealing property of the lid.

(2) Double Cushion Layers

Figure 2:
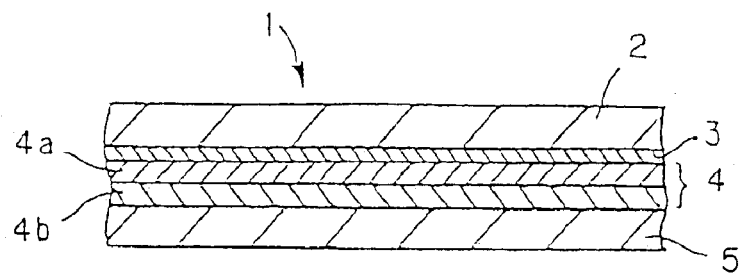
FIG. 2 is a schematic sectional view illustrating another example of the lid of the invention.

FIG. 2 is a schematic sectional view illustrating an example of the lid of the present invention having a cushion layer of the double-layer structure. The cushion layer 4 comprises a first resin layer 4*a* and a second resin layer 4*b*.

In this case, the first resin layer 4*a* may be formed from ethylene-α-olefin copolymer having a density within a range of from 0.915 to 0.940 g/cm$^3$.

The second resin layer 4*b* may be formed from a resin composition prepared by adding from 5 to 30 weight parts hydrogenated styrene-butadiene block copolymer comprising from 10 to 50 wt. % styrene and from 90 to 50 wt. % butadiene, to 100 weight parts resin composition comprising from 10 to 90 wt. % ethylene-α-olefin copolymer having a density within a range of from 0.915 to 0.940 g/cm$^3$, and from 70 to 30 wt. % styrene-butadiene block copolymer comprising from 50 to 90 wt. % styrene and from 50 to 10 wt. % butadiene. Furthermore, the second resin layer 4*b* may be formed from a resin composition prepared by adding from 5 to 50 weight parts high-impact polystyrene to 100 weight parts resin composition comprising from 10 to 90 wt. % ethylene-α-olefin copolymer having a density within a range of from 0.915 to 0.940 g/cm$^3$, and from 70 to 30 wt. % styrene-butadiene block copolymer comprising from 50 to 90 wt. % styrene and from 50 to 10 wt. % butadiene. The second resin layer 4*b* may be formed also from a resin composition prepared by adding from 5 to 30 weight parts hydrogenated styrene-butadiene block copolymer comprising from 10 to 50 wt. % styrene and from 90 to 50 wt. % butadiene and from 5 to 50 weight parts high-impact poly styrene, to 100 weight parts resin composition comprising from 10 to 90 wt. % ethylene-α-olefin copolymer having a density within a range of from 0.915 to 0.940 g/cm³, and from 70 to 30 wt. % styrene-butadiene block copolymer comprising from 50 to 90 wt. % styrene and from 50 to 10 wt. % butadiene.

The thickness of these first resin layer 4a and the second resin layer 4b may be within ranges of from 5 to 30 μm and from 5 to 30 μm, respectively.

(3) Triple Cushion Layers

Figure 3:
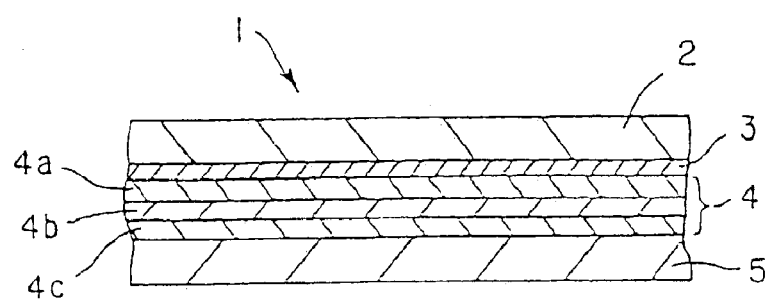
FIG. 3 is a schematic sectional view illustrating still another example of the lid of the invention.

FIG. 3 is a schematic sectional view illustrating an example of the lid of the invention having a triple-structured cushion layer. The cushion layer 4 is composed of a first resin layer 4a, a second resin layer 4b, and a third resin layer 4c in contact with the heat sealing layer 5.

In this case, the first resin layer 4a may be formed from ethylene-α-olefin copolymer having a density within a range of from 0.915 to 0.940 g/cm³; the second resin layer 4b may be formed from a resin composition comprising from 10 to 90 wt. % ethylene-α-olefin copolymer having a density within a range of from 0.915 to 0.940 g/cm³, and from 70 to 30 wt. % styrene-butadiene block copolymer comprising from 50 to 90 wt. % styrene and from 50 to 10 wt. % butadiene.

The third resin layer 4c is formed from a resin composition prepared by adding from 5 to 30 weight parts hydrogenated styrene-butadiene block copolymer comprising from 10 to 50 wt. % styrene and from 90 to 50 wt. % butadiene, to 100 weight parts resin composition comprising from 10 to 90 wt. % ethylene-α-olefin copolymer having a density within a range of from 0.915 to 0.940 g/cm³, and from 70 to 30 wt. % styrene-butadiene block copolymer containing from 50 to 90 wt. % styrene and from 50 to 10 wt. % butadiene. The third resin layer 4c may also be formed from a resin composition prepared by adding from 5 to 50 weight parts high-impact polystyrene to 100 weight parts resin composition comprising from 10 to 90 wt. % ethylene-α-olefin copolymer having a density within a range of from 0.915 to 0.940 g/cm³ and from 70 to 30 wt. % styrene-butadiene block copolymer containing from 50 to 90 wt. % styrene and from 50 to 10 wt. % butadiene. Furthermore, the third resin layer 4c may be formed also from a resin composition prepared by adding from 5 to 30 weight parts hydrogenated styrene-butadiene block copolymer comprising from 10 to 50 wt. % styrene and from 90 to 50 wt. % butadiene and from 5 to 50 weight parts high-impact polystyrene to 100 weight parts resin composition comprising from 10 to 90 wt. % ethylene-α-olefin copolymer having a density within a range of from 0.915 to 0.940 g/cm³ and from 70 to 30 wt. % styrene-butadiene block copolymer containing from 50 to 90 wt. % styrene and from 50 to 10 wt. % butadiene.

The thickness of these first resin layer 4a, second resin layer 4b and third resin layer 4c may be set within a range of from 3 to 20 μm, respectively.

(4) Effects of Third Embodiment

As a result of the lid having the cushion layer of this embodiment, peeling between the cushion layer and the heat sealing layer, or peeling caused by cohesive fracture in the interior of the heat sealing layer occurs upon stripping off the lied heat sealed to the carrier tape. The peeling strength in this case is weaker than the heat sealing strength of the heat sealing layer with the carrier tape as described later, and should preferably be within a range of from 100 to 1,200 g/15 mm. A peeling strength of under 100 g/15 mm causes peeling between the cushion layer and the heat sealing layer, or peeling caused by cohesive fracture in the interior of the heat sealing layer during transportation of the carrier tape package after heat sealing of the lid, thus giving rise to the risk of the contents of dropping. A peeling strength of over 1,200 g/15 mm is not desirable because vibration of the carrier tape upon peeling the lid may cause the contents to fly out. The above-mentioned peeling strength is a 180° peeling (peeling speed=300 mm/minute) value in an atmosphere at 23° C. with an RH of 40%.

Therefore, the lid can be certainly peeled off from the carrier tape by using a sufficiently high heat sealing strength of the heat sealing layer to the carrier tape and heat-sealing the same.

Whether peeling between the cushion layer and the heat sealing layer (interlayer peeling) is to be caused or peeling by cohesive fracture is to be caused in the heat sealing layer can be appropriately selected by controlling heat sealing conditions. That is, by using more strict conditions for heat sealing (a higher heating temperature, a longer heating time and a higher pressing pressure), an interlayer peeling between the cushion layer and the heat sealing layer can be caused, and by alleviating the heat sealing conditions, peeling by cohesive fracture in the heat sealing layer can be caused. More specifically, approximate heat sealing conditions include, in the case of interlayer peeling, a heating temperature of from 140 to 200° C., a heating time of from 0.5 to 2.0 seconds, and a pressing pressure of from 1.0 to 5.0 kgf/cm²; in the case of cohesive fracture, a heating temperature of from 100 to 150° C., a heating time of from 0.1 to 1.0 second and a pressing pressure of from 0.5 to 3.0 kgf/cm².

Since, in this third embodiment of the cushion layer, it is possible to improve adhesivity with the heat sealing layer while maintaining functions of the cushion layer, the lid may comprise a combination with the heat sealing layer comprising a conventional heat sealing material, except for the case where a combination with a heat sealing layer using the above-mentioned transparent conductive heat sealing material. The same effects are available even in such a case.

(Heat Sealing Layer)

The heat sealing layer in the lid of the invention is formed by use of the above-mentioned transparent conductive heat sealing material. Since the transparent conductive heat sealing material has been described above, description is omitted here.

The coating weight when using the transparent conductive heat sealing material as the heat sealing layer should preferably be within a range of from 0.1 to 8 g/m². A coating weight smaller than this range Leads to problems in adhesion strength. There is no remarkable change in effects even when a larger weight is coated, and problems are encountered in cost such as waste of materials cost.

No particular restriction is imposed on the coating method. A known coating method such as the gravure direct process or the gravure reversing process may be applied.

In the invention, the heat sealing layer may as required contain additives such as a dispersion stabilizer and an anti-blocking agent. The heat sealing layer may be coated and formed on the cushion layer.

(Primer Layer)

Figure 4:
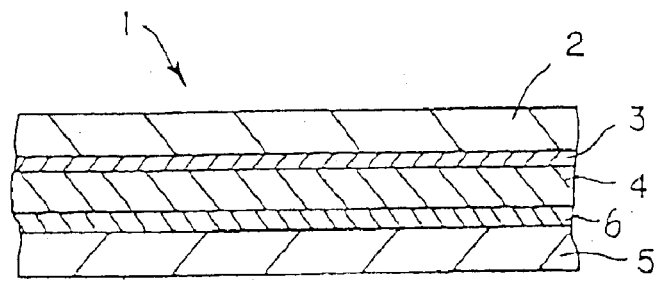
FIG. 4 is a schematic view illustrating further another example of the lid of the invention.

FIG. 4 is a schematic sectional view illustrating another example of the lid of the invention. In the invention, a primer layer 6 may be provided between the heat sealing layer 5 and the cushion layer 4. Particularly when it is required to inhibit delamination between the cushion layer 4 and the heat sealing layer 5, or when it is necessary to improve adhesion between the cushion layer 4 and the heat sealing layer 5, the primer layer is suitably applicable.

In the lid having a primer layer 6 formed thereon, delamination between the cushion layer 4 and the heat sealing layer 5 is inhibited. It is therefore possible to improve exterior view upon peeling off the lid heat-sealed to the carrier tape, and improve adhesion between the cushion layer 4 and the heat sealing layer 5, thus permitting adjustment of adhering force of the lid at a level higher than the appropriate strength. Furthermore, when heat-sealing the lid to the carrier tape, there is available an effect of permitting alleviation of the influence of the heat sealing conditions on delamination and adhesion, by providing such a primer layer. The term delamination as used herein means that application of an appropriate force results in easy peeling.

Such a primer layer can be formed from olefin, modified olefin, urethane, modified urethane, hydrogenated SBS or a mixture thereof.

A resin composition suitable for forming the primer layer comprises from 0 to 100 wt. % styrene-ethylene-butylene-styrene copolymer (SEBS) and from 100 to 0 wt. % acid-modified styrene-ethylene-butylene-styrene copolymer. Styrene-ethylene-butylene-styrene copolymer and acid-modified styrene-ethylene-butylene-styrene copolymer are suitably applicable independently. By using these copolymers within the above-mentioned ranges, it is possible to remarkably improve adhesion between the primer layer and the cushion layer, and at the same time, to improve adhesion between the primer layer and the heat sealing layer. As a result, in the heat-sealed lamination of the invention, the cushion layer and the heat sealing layer can be bonded with a sufficient strength by the intermediary of the primer layer. Acrylic rubber should preferably be added to this resin composition in an amount of up to 60 wt. % of the total resin composition. By adding acrylic rubber in an amount of up to 60 wt. % of the total resin composition, it is possible to ensure full display of the functions of the primer layer and further improve adhesion.

The above-mentioned styrene-ethylene-butylene-styrene copolymer is a hydrogenated styrene-butadiene-styrene copolymer, and the above-mentioned acid-modified styrene-ethylene-butylene-styrene copolymer is a styrene-ethylene-butylenes-styrene copolymer having an acid modification ratio within a range of from 1 to 100%.

Acrylic rubber is a rubber containing alkyl acrylate ester as a main constituent. Applicable acrylic esters generally include ethyl acrylate, butyl acrylate, methoxyethyl acrylate, and acrylonitrile. Applicable cross-linking functional groups composing acrylic rubber include 2-chloroethylvinylether, monomers containing active halogen (monochlorovinyl acetate, allylchloroacetate, etc.), monomer containing epoxy group (allylglycidylether, glycidylmethacrylate, etc.), and ethylidennorbornene.

The coating weight of the primer layer should preferably be within a range of from 0.05 to 2.5 g/m$^2$, particularly from 0.1 to 2.0 g/m$^2$. A coating weight of under this range results in an insufficient effect as a primer layer, and a coating weight of over this range leads to no further effect, posing a cost problem.

(Manufacturing Method of Carrier Tape Lid)

The carrier tape lid of the invention can be manufactured by use of the usual film laminating process, and no particular restriction is imposed on the manufacturing method.

(Carrier Tape Lid)

In the lid of the invention as described above, the heat sealing layer is formed from the above-mentioned transparent conductive heat sealing material. Even when it is heat-sealed onto the carrier tape to form a carrier tape package, therefore, the contents are never damaged by electrostatic discharge, and no problem is posed in visual recognition of the contents.

Preferable optical properties of the lid itself of the invention include a haze of up to 25% and a full-light transmissivity of at least 70%, and particularly a haze of up to 20% and a full-light transmissivity of at least 80%.

3. Carrier Tape Package

Figure 5:
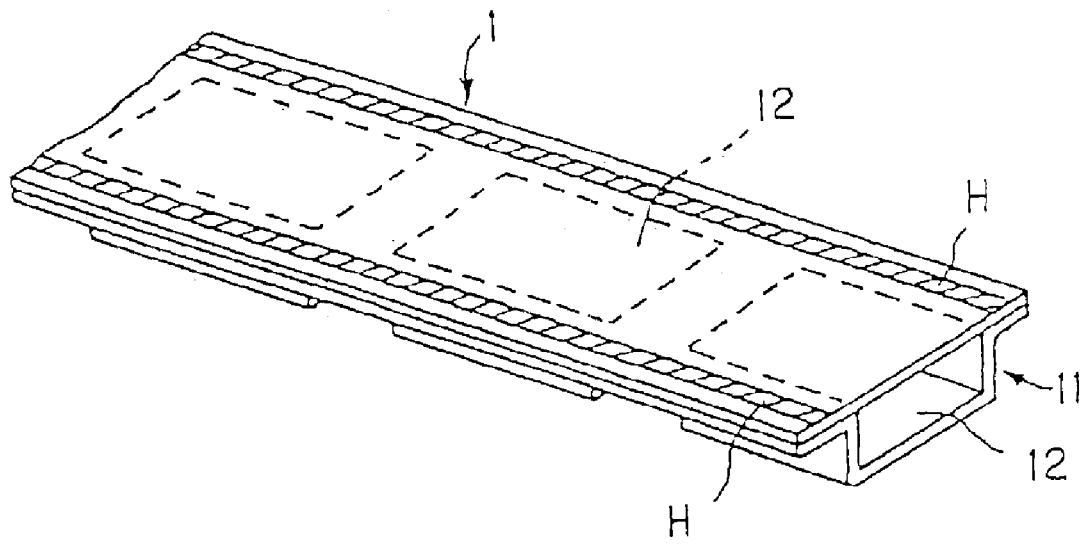
FIG. 5 is a perspective view illustrating a state in which the lid of the invention is heat-bonded onto a carrier tape.

The above-mentioned carrier tape lid, as heat-sealed onto the carrier tape, is used as a carrier tape package. For example, as shown in FIG. 5, the carrier tape lid 1 is bonded onto the carrier tape 11 having a housing section 12 for housing an article to be packaged by heat sealing a heat sealing section H having a prescribed width in a linear shape to the both ends of the housing section 12, in the example shown in FIG. 5, into a carrier tape package. The above-mentioned housing section is usually an emboss-formed pocket, as shown in FIG. 5, and many such pockets are continuously formed in the longitudinal direction of the carrier tape.

The carrier tape is formed by any of resins such as polyvinyl chloride (PVC), polystyrene (PS), polyester (A-PET, PEN, PET-G, PCTA), polypropylene (PP), polycarbonate (PC), polyacrylonitrile (PAN), and acrylonitrile-butadiene-styrene copolymer (ABS), or these resins prepared through kneading or coating of conductive carbon fine particles, metal fine particles, conductive fine powder prepared by imparting conductivity to metal oxides such as tin oxide, zinc oxide and titanium oxide, Si-based organic compounds, and a surfactant for antistatic purpose. Also applicable is a composite plastic sheet formed by integrally laminating by co-extrusion a PS-based or ABS-based resin film or sheet containing carbon black on a single surface or both surfaces of a PS-based sheet or an ABS-based resin sheet. Another example is a plastic film, on the surface of which a conductive polymer is formed as a conductivity treatment.

The present invention is not limited to the above-mentioned embodiments. The embodiments are only examples, and all that have substantially the same configuration as that of the technical ides recited in the patent claims of the invention and give similar effects are contained in the technical scope of the present invention.

EXAMPLES

The present invention will now be described in detail by means of examples. The invention is not limited to the examples described hereafter.

Example 1

An urethane-based anchor coating agent mixed with an appropriate amount of an isocyanate-based curing agent was coated by the gravure direct process onto a side of a 16 $\mu$m-thick antistatic type biaxially oriented polyethylene-terephthalate (PET) film (outer layer) so as to give a coating weight of 0.2 g/m$^2$ (bonding layer). Straight-chain polyethylene polymerized with a single-site catalyst was extruded in a thickness of 25 $\mu$m and laminated by the extrusion laminating process (cushion layer), thereby obtaining a substrate having a cushion layer formed via the bonding layer on the outer layer. The surface wettability was brought to 420 $\mu$N by applying a corona treatment on the surface of straight-chain polyethylene serving as the cushion layer.

Acid-modified olefin in an amount of 1.0 g/m$^2$ was coated by the gravure direct process to form a primer layer on the surface of the substrate on the cushion layer side.

A mixture of 200 weight parts as solid base of a conductive acicular tin oxide fine powder having a 50% particle size of 0.05 $\mu$m relative to 100, weight parts as solid base of an acrylic heat sealing agent was coated as a transparent conductive heat sealing material onto the surface of the substrate on the cushion layer side by the gravure reversing process so as to give a coating weight of 2 g/m$^2$ (heat sealing layer), thereby obtaining a lid.

The resultant lid had a surface resistivity of $10^8$ $\Omega$/square, a full-light transmissivity of 90%, and a haze of 6%, and showed satisfactory antistatic property and transparency.

The above-mentioned lamination was sliced into a width of 21.5 mm to form a carrier tape lid. The resultant carrier tape lid was heat-sealed to carrier tapes made of polystyrene (PS), polyvinyl chloride (PVC), and polycarbonate (PC) at a sealing temperature of 140° C. This resulted in peeling strength values of 40 gf, 45 gf and 40 gf, respectively, suggesting a satisfactory peeling strength. The contents could easily be visually recognized.

Examples 2 to 10 and 12

Lids were obtained in the same manner as in Example 1 except that the materials were changed into ones shown in Table 1. The result of evaluation of the lids are shown in Table 2. The values of peeling strength are for polystyrene.

Example 11

A lid was obtained in the same manner as in Example 1, except that a 30 μm-thick straight-chain polyethylene film was dry-laminated on PET. The resultant lid had a satisfactory peeling strength as 40 gf. The contents could easily be visually recognized.

Example 13

A lid was obtained in the same manner as in Example 11, except that the PET film thickness and the material of the primer layer were changed. The result of evaluation is shown in Table 2.

Example 14

A lid was obtained by changing the conductive fine particles into spherical fine particles having a 50% particle size of 1.0 μm and changing other conditions as shown in Table 1. The result of evaluation is shown in Table 2.

TABLE 1

| A | B | C | | D | | E | | | | |
|---|---|---|---|---|---|---|---|---|---|---|
| a | b | c | d | e | f | g | h i | j | k | l |
| Ex. 1 | PET | 16 | w | LL | 25 | x | 1.0 | y z | 2.0 | 100:200 | 14 |
| Ex. 2 | PET | 16 | w | LL | 25 | x | 0.3 | y z | 2.0 | 100:200 | 14 |
| Ex. 3 | PET | 16 | w | LL | 25 | x | 2.0 | y z | 2.0 | 100:200 | 14 |
| Ex. 4 | PET | 25 | w | LL | 30 | x | 1.0 | y z | 2.0 | 100:200 | 15 |
| Ex. 5 | PET | 16 | w | LL | 25 | x | 1.0 | y z | 0.5 | 100:200 | 14 |
| Ex. 6 | PET | 16 | w | LL | 25 | x | 1.0 | y z | 4.0 | 100:200 | 14 |
| Ex. 7 | PET | 16 | w | LL | 25 | x | 1.0 | y z | 2.0 | 100:100 | 14 |
| Ex. 8 | PET | 16 | w | LL | 25 | x | 1.0 | y z | 2.0 | 100:400 | 14 |
| Ex. 9 | PET | 16 | w | LDPE | 25 | x | 0.6 | y z | 2.0 | 100:200 | 18 |
| Ex. 10 | PP | 16 | w | EMAA | 25 | x | 1.0 | y z | 2.0 | 100:200 | 2 |
| Ex. 11 | PET | 16 | w | LL | 30 | x | 1.0 | y z | 2.0 | 100:200 | 13 |
| Ex. 12 | PET | 16 | w | LL | 30 | x | 1.0 | y z | 2.0 | 100:200 | 13 |
| Ex. 13 | PET | 12 | w | LL | 30 | x' | 1.0 | y z | 2.0 | 100:200 | 13 |
| Ex. 14 | PET | 12 | w | LL | 30 | x' | 0.9 | y z' | 2.4 | 100:150 | — |

A: Outer layer,
B: Bonding layer,
C: Cushion layer,
D: Primer layer,
E: Heat sealing layer,
a: Material,
b: Thickness (μm),
c: Material,
d: Material,
e: Thickness (μm),
f: Material,
g: Coating weight (g/m$^2$),
h: Synthetic resin,
i: Tin oxide fine powder,
j: Coating weight (g/m$^2$),
k: Mixing ratio,
l: Amount of curling (mm),
PET: Polyethyleneterephthalate;
PP: Polyethylene;
w: Urethane;
LL: Straight-chain polyethylene;
LDPE: Low-density polyethylene;
EMAA: Ethylene-methacrylic acid copolymer;
x: Modified polyolefine;
x': Hydrogenated SBS, hydrogenated styrene-ethylene-butadiene-styrene block copolymer;
y: Acrylic resin,
z: Acicular, acicular tin oxide fine particles having a 50% particle size of 0.05 μm,
z': Spherical, spherical tin oxide fine particles having a 50% particle size of 1.0 μm
*1: Containing an isocyanate-based curing agent;
*2: Mixing ratio of synthetic resin: tin oxide fine powder (in weight);

TABLE 2

| | Surface resistivity [Ω/square] | Full-light transmissivity [%] | Haze [%] | Peeling strength [gf/mm] |
|---|---|---|---|---|
| Example 1 | 2 × 10$^8$ | 90 | 6 | 40 |
| Example 2 | 2 × 10$^8$ | 91 | 6 | 40 |
| Example 3 | 2 × 10$^8$ | 90 | 6 | 45 |
| Example 4 | 2 × 10$^8$ | 89 | 7 | 35 |
| Example 5 | 2 × 10$^8$ | 90 | 5 | 38 |
| Example 6 | 2 × 10$^8$ | 89 | 7 | 41 |
| Example 7 | 7 × 10$^9$ | 90 | 6 | 43 |
| Example 8 | 1 × 10$^7$ | 89 | 7 | 38 |
| Example 9 | 2 × 10$^8$ | 89 | 7 | 45 |
| Example 10 | 2 × 10$^8$ | 91 | 6 | 35 |
| Example 11 | 2 × 10$^8$ | 89 | 8 | 35 |
| Example 12 | 2 × 10$^8$ | 89 | 8 | 35 |
| Example 13 | 2 × 10$^8$ | 89 | 8 | 35 |
| Example 14 | 1 × 10$^8$ | 91 | 21 | 39 |

The present invention will now be described further in detail by means of examples carried out with changed materials of the primer layer.

Example A

An urethane-based bonding agent (referred to as "urethane" in Table 3) mixed with an appropriate amount of an isocyanate-based curing agent was coated by the gravure direct process onto a side of a 12 μm-thick antistatic type biaxially oriented polyethylene terephthalate (referred to as "PET" in Table 3) film (outer layer) so as to give a coating weight of 4.0 g/m$^2$ (bonding layer). A film (cushion layer) of straight-chain polyethylene (referred to as "LL" in Table 3) polymerized with a single-site catalyst laminated by dry lamination into a thickness of 30 μm, thereby obtaining a substrate having a cushion layer formed via the bonding layer on the outer layer.

Styrene-ethylene-butylene-styrene copolymer which is the resin composition forming the primer layer (referred to as "SEEB" in Table 3) in an amount of 1.0 g/m$^2$ was coated by the gravure direct process to form a primer layer on the surface of the substrate on the cushion layer side.

A mixture of 200 weight parts as solid base of a conductive acicular tin oxide fine powder having a 50% particle size of 0.05 μm relative to 100 weight parts as solid base of an acrylic heat sealing agent was coated as a transparent conductive heat sealing material onto the surface of the substrate on the cushion layer side by the gravure reversing process so as to give a coating weight of 2.1 g/m² (heat sealing layer), thereby obtaining a lid.

The resultant lid had a surface resistivity of 3×10⁷ Ω/square, a full-light transmissivity of 90.3%, and a haze of 6.4%, and showed satisfactory antistatic property and transparency.

The above-mentioned lamination was sliced into a width of 21.5 mm to form a carrier tape lid. The resultant carrier tape lid was heat-sealed to a carrier tape made of polystyrene (PS) at a sealing temperature of 150° C. This resulted in a peeling strength of 39 gf, suggesting a satisfactory peeling strength. The contents could easily be visually recognized.

Examples B to I

Lids were obtained in the same manner as in Example A except that the resin composition for forming a primer layer and the coating weight thereof were changed into those shown in Table 3. The result of evaluation of these lids is shown in Table 4.

TABLE 3

| | A | | B | | C | | D | | | | E | |
|---|---|---|---|---|---|---|---|---|---|---|---|---|
| | a | b | c | | d | e | f | g | h | i | j | k |
| Example A | PET | 12 | urethane | | LL | 30 | 100 | 0 | 0 | 1.0 | 100:200 | 2.1 |
| Example B | PET | 12 | urethane | | LL | 30 | 0 | 100 | 0 | 1.0 | 100:200 | 1.9 |
| Example C | PET | 12 | urethane | | LL | 30 | 50 | 50 | 0 | 1.0 | 100:200 | 2.0 |
| Example D | PET | 12 | urethane | | LL | 30 | 47 | 47 | 6 | 1.1 | 100:200 | 2.0 |
| Example E | PET | 12 | urethane | | LL | 30 | 30 | 60 | 10 | 1.0 | 100:200 | 2.2 |
| Example F | PET | 12 | urethane | | LL | 30 | 0 | 90 | 10 | 0.9 | 100:200 | 2.2 |
| Example G | PET | 12 | urethane | | LL | 30 | 90 | 0 | 10 | 1.2 | 100:200 | 2.1 |
| Example H | PET | 12 | urethane | | LL | 30 | 47 | 47 | 6 | 0.3 | 100:200 | 2.3 |
| Example I | PET | 12 | urethane | | LL | 30 | 47 | 47 | 6 | 3.0 | 100:200 | 2.0 |

A: Outer layer,
B: Bonding layer,
C: Cushion layer,
D: Primer layer,
E: Heat sealing layer,
a: Material,
b: Thickness (μm),
c: Material,
d: Material,
e: Thickness (μm),
f: SEBS,
g: Acid modified SEBS,
h: Acrylic rubber,
i: Coating weight (g/m²),
j: Synthetic resin:tin oxide (mixing ratio),
k: Coating weight (g/m²),
PET: Polyethyleneterephthalate;
LL: straight chain linear polyethylene;
SEBS: styrene-ethylene-butylene-styrene copolymer;
acid-modified SEBS: acid-modified styrene-ethylene-butylene-styrene copolymer

TABLE 4

| | A | B | C | D | E |
|---|---|---|---|---|---|
| Example A | 3 × 10⁷ | 90.3 | 6.4 | 150 | 39 |
| Example B | 3 × 10⁷ | 89.6 | 6.7 | 135 | 61 |
| Example C | 1 × 10⁷ | 90.5 | 6.8 | 140 | 50 |
| Example D | 6 × 10⁶ | 90.3 | 6.9 | 155 | 40 |
| Example E | 1 × 10⁸ | 89.3 | 7.3 | 155 | 40 |
| Example F | 7 × 10⁷ | 89.9 | 6.2 | 140 | 44 |
| Example G | 7 × 10⁶ | 90.2 | 7.7 | 160 | 31 |
| Example H | 1 × 10⁷ | 90.7 | 7.3 | 160 | 40 |
| Example I | 3 × 10⁷ | 90.5 | 7.5 | 145 | 42 |

A: Surface resistivity [Ω/square],
B: Full-light transmissivity [%],
C: Haze [%],
D: Sealing temperature [° C.],
E: Peeling strength [gf/mm]

(Measuring Conditions of Haze and Full-light Transmissivity)

Measurement was accomplished by means of a color computer SM-5SC made by Suga Tester Co., Ltd.

(Measuring Conditions of Surface Resistivity)

The surface resistivity was measured by means of a HIGHRESTER IP made by Mitsubishi Petrochemical Corp. at 22° C. and an RH of 40%.

(Measuring Conditions of Peeling Strength)

The resultant heat sealing lamination was sliced into a width of 21.5 mm to form a carrier tape lid, which was heat-sealed with a 24 mm-width polystyrene (PS) carrier tape, and peeling strength was measured.

(Evaluating Conditions of the Amount of Curling)

The lid was cut into 15 cm-square piece. A cross-notch 4 cm×4 cm was made at the center thereof. After holding until stabilization of the amount of curling, the piece was observed from a side, and the distance between the most distant portion from the lid flat surface at the cross center and the lid flat surface was measured. The measured Industrial Applicability The transparent conductive heat sealing material of the present invention can be considered a conductive heat sealing material excellent in transparency. It is therefore suitably applicable as a lid for a carrier tape package used when storing, transporting or mounting electronic products easily susceptible to breakage by static electricity, particularly chip type electronic products and electronic circuit boards mounting parts.

What is claimed is:

1. A carrier tape lid comprising:
   at least a heat sealing layer, wherein said heat sealing layer is formed by a transparent conductive heat sealing material comprising conductive acicular fine particles having a 50% particle size of up to 1.0 μm dispersed in a heat sealable synthetic resin;
   an outer layer formed by a biaxially oriented film; and
   a cushion layer arranged between said heat sealing layer and outer layer, wherein said carrier tape lid has optical properties of a full-light transmissivity of at least 80% and a haze of up to 8%.

2. The carrier tape lid of claim 1, wherein the transparent conductive heat sealing material has a surface resistance of $10^4$ to $10^{12}$ Ω/square.

3. The carrier tape lid of claim 1, wherein said conductive fine particles comprise fine particles prepared by imparting conductivity to a metal oxide.

4. The carrier tape lid of claim 3, wherein said fine particles prepared by imparting conductivity to said metal oxide comprise acicular powder of antimony-doped tin oxide.

5. The carrier tape lid of claim 1, wherein said heat-sealable synthetic resin comprises any one of a polyester resin, a polyurethane resin, a vinyl chloride-vinyl acetate copolymer resin, an acryl resin, and an ethylene-vinyl acetate copolymer resin, or a combination thereof.

6. The carrier tape lid of claim 1, wherein said cushion layer comprises a layer formed by polyolefin having a density within a range of from 0.900 to 0.910 g/cm.$^3$ and a weight average molecular weight within a range of from 20,000 to 100,000.

7. A carrier tape lid comprising: at least a heat sealing layer, wherein said heat sealing layer is formed by a transparent conductive heat sealing material comprising conductive acicular fine particles having a 50% particle size of up to 1.0 μm dispersed in a heat sealable synthetic resin; an outer layer formed by a biaxially oriented film; a cushion layer arranged between said heat sealing layer and outer layer; and a primary layer arranged between said heat sealing layer and said cushion layer, wherein said carrier tape lid has optical properties of a full-light transmissivity of at least 80% and a haze of up to 8%.

8. The carrier tape lid of claim 7, wherein said primer layer is formed by a resin composition comprising from 0 to 100 wt. % styrene-ethylene-butylene-styrene copolymer and from 100 to 0 wt. % acid-modified styrene-ethylene-butylene-styrene copolymer.

9. The carrier tape lid of claim 7, wherein acrylic rubber is added at a ratio of up to 60 wt. % relative to the total resin composition to the resin composition forming said primer layer.

10. A carrier tape lid comprising:
   at least a heat sealing layer, wherein said heat sealing layer is formed by a transparent conductive heat sealing material comprising conductive acicular fine particles of antimony-doped tin oxide, having a 50% particle size of up to 1.0 μm., dispersed in a heat sealable synthetic resin;
   an outer layer formed by a biaxially oriented film; and
   a cushion layer arranged between said heat sealing layer and outer layer,
wherein said carrier tape lid has optical properties of a full-light transmissivity of at least 80% and a haze of up to 8%.

* * * * *